INVENTORS
HOWARD J. GOLDMAN
HARRY A. WAYNE
BY Bair, Freeman & Molinare
ATTORNEYS United States Patent Office 3,239,668
Patented Mar. 8, 1966

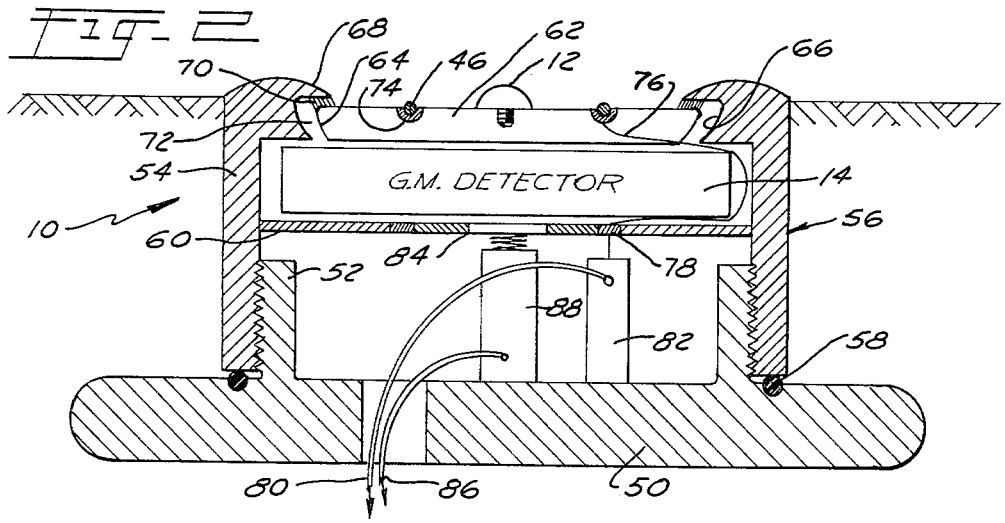
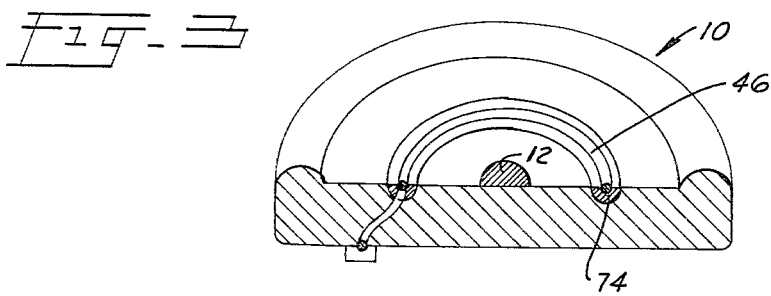
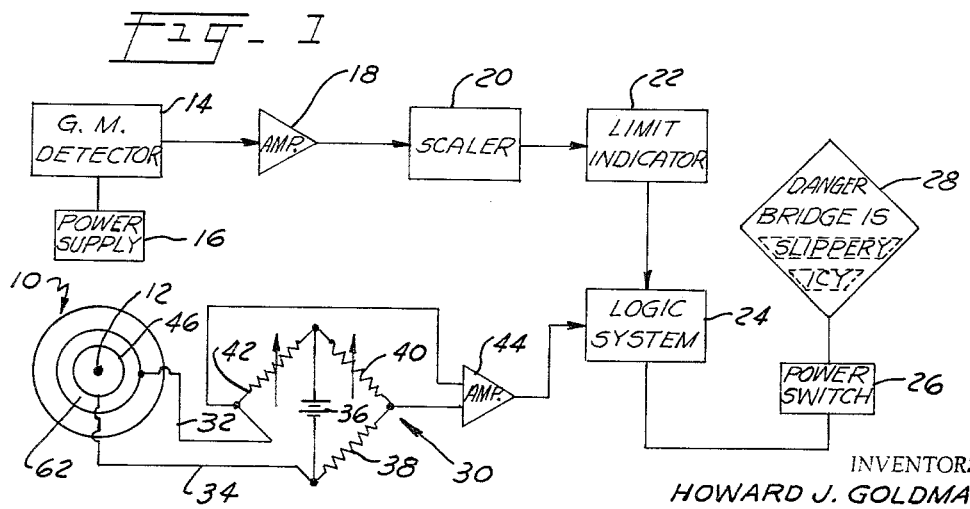
INVENTORS
HOWARD J. GOLDMAN
HARRY A. WAYNE
BY Bair, Freeman & Molinare
ATTORNEYS March 8, 1966 H. J. GOLDMAN ETAL 3,239,668
FROST-ICE DETECTOR UTILIZING A RADIOACTIVE SOURCE AND DETECTOR
Filed March 2, 1964 2 Sheets-Sheet 2

3,239,668
FROST-ICE DETECTOR UTILIZING A RADIO-
ACTIVE SOURCE AND DETECTOR
Howard J. Goldman, 35 Wilmette Ave., Glenview, Ill.,
and Harry A. Wayne, 4120 Greenwood Ave., Skokie,
Ill.
Filed Mar. 2, 1964, Ser. No. 348,626
7 Claims. (Cl. 250—83.3)

This invention relates generally to improvements in the detection of certain surface conditions and more particularly to a new and improved method and apparatus for detecting icy and/or slippery surfaces by sensing the nuclear particle absorbing and deflecting properties of such surfaces.

This application is a continuation-in-part of the copending applications of Howard J. Goldman entitled Procedure and Apparatus for Nuclear Detection-Analysis for Use on Road Surfaces and the Like, Serial No. 181,989, filed March 23, 1962, and is directed to an improvement of the invention disclosed therein. The prior co-pending application discloses a nuclear sensing head having a source of beta particles which transmits beta particles through a thin film or layer of nuclear particle absorbing and deflecting material, such as ice or the like. The sensing head further includes an input window disposed a predetermined distance from the source for channeling the beta particles into a nuclear detector, such as a G-M tube, to provide an output signal which is dependent upon the absorption and deflection properties of the material defining the thin film or layer. This output signal then is utilized to provide an indication of the condition of the surface upon which such material is deposited.

While the invention disclosed in the above-identified co-pending application has been used with considerable success, as in detecting and indicating dangerous driving conditions due to the presence of ice on a roadway, it is desirable to provide an improved form of detector which is capable of distinguishing between icy and wet surface conditions so as to provide a remote indication of either or both of such conditions when appropriate. It further is desirable to provide an improved form of sensing head which is more durable and wherein collimation of the radiation may be effected either at the source or at a point remote from the source, adjacent the input window, or both and in which backscattering surfaces formed of materials other than lead can be utilized.

Accordingly, it is a general object of this invention to provide a new and improved nuclear sensing and indicating system adapted to selectively sense and indicate icy and/or wet surface conditions.

It is another object of this invention to provide such an improved system having a sensing head which differentiates between surface deposits which are conductive and surface deposits which are non-conductive, such as rain water as distinguished from ice or frost.

It is appreciated that purely conductive sensing heads are known in the prior art, and are used for road ice detection. However, because ice is a poor conductor, the prior art conductive devices are necessarily dependent upon other environmental conditions such as temperature or humidity. As such, they measure the conditions which theoretically would lead to the formation of ice rather than measuring the actual presence of ice itself. The present improvement invention overcomes the inherent deficiencies of prior art sensing heads by utilizing a combination of beta radiation and purely conductive sensing. As a result, the actual existence of ice or frost, as contrasted to the theoretically probable existence of ice or frost, is measured.

Thus, it is a specific object of this invention to provide a new and improved road surface condition sensing system which combines an electrically conductive circuit for detecting conductive deposits with a nuclear radiation circuit for detecting non-conductive deposits.

It is another object of this invention to provide a logic circuit which is responsive to the operation of the combined electrical and nuclear circuits for indicating the presence of conductive and/or non-conductive surface conditions, such as rain water and ice, respectively.

It is still another object of this invention to provide an improved, durable form of nuclear operable surface condition sensing head which is resistant to perforation and water damage when placed in a roadway or other travelled area.

It is a further object of this invention to provide an improved nuclear operable surface condition sensing head of unique construction which eliminates the need for collimation of the source radiation and/or for a lead back scattering surface.

It is a still further object of this invention to provide a new and improved road surface condition sensing system which is characterized by its relative durability, its efficiency of operation and its unique ability to distinguish and indicate icy and/or wet, slippery surfaces.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which:

FIGURE 1 is a block diagram of one illustrative embodiment of the invention which is adapted for sensing and indicating the presence of icy or wet surface conditions;

FIGURE 2 is a cross-sectional view of an improved form of nuclear sensing head embodied in the present invention;

FIGURE 3 is a perspective view, partially broken away and in cross-section, of the top portion of the improved nuclear sensing head, particularly illustrating the conductive ring;

Figure 4:
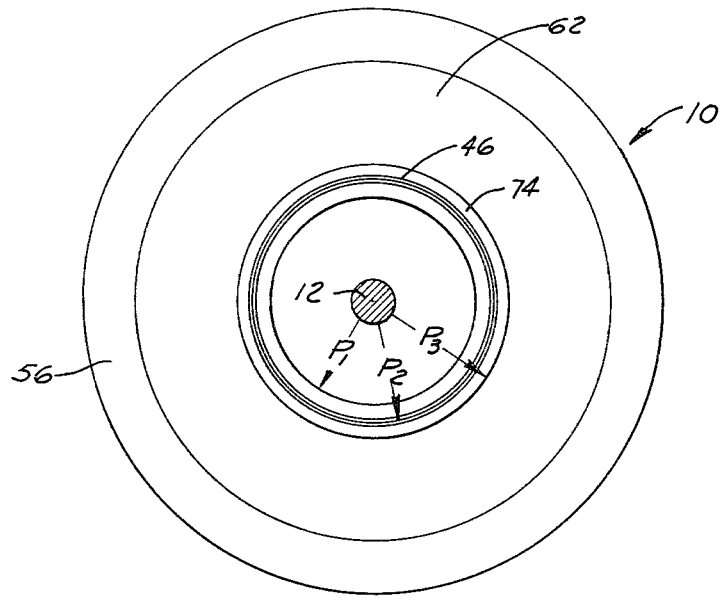
FIGURE 4 is a top plan view of the improved nuclear sensing head.

Refer now to the drawing, and more particularly to FIGURE 1 thereof, which illustrates a block diagram representation of a surface condition sensing and indicating system embodying the present invention. This improved system will be described with reference to the system disclosed in the earlier co-pending application of Howard J. Goldman, above identified, so that the improvement features will readily be appreciated by those skilled in the art.

In the system of FIGURE 1, a nuclear sensing head 10 advantageously is provided with a radiation source of nuclear particles 12. Although a number of different types of radioactive materials may be used for this purpose, advantageously, the radiation source 12 may take the form of an epoxy member having the radiation material embedded therein. It has been found that a radiation material such as strontium 90 is highly suitable although other radioactive materials may be used, with the only requirement being long radioactive life and ample nuclear particle emission.

As explained in greater detail hereinbelow, the nuclear sensing head 10 further comprises a nuclear particle detector 14, which may be in the form of an ionization chamber, such as a Geiger-Mueller, or G–M, tube, or a solid state detector, having a suitable power supply 16 connected thereto. The formation of frost or ice upon the layer surface of the sensing head 10 affects the number of nuclear particles detected by the nuclear particle detector 14. Thus, the formation of frost or ice on the surface of the nuclear sensing head 10 reduces the number of particles entering the G–M detector 14, and consequently, reduces the number of output pulses which are provided from the G–M detector 14 through the amplifier 18 to the scaler 20. The scaler 20 maintains a continuous count of the nuclear particles radiated across the layer surface of the sensing head 10, and a decrease in such count due to the presence of ice or the like on the layer surface, results in the operation of the limit indicator 22 and logic system 24 to operate the power switch 26, and thereby cause the sign 28 to be energized for lighting the word "ICY." It will be appreciated that the use of such a system upon a roadway, for example, with the sensing head embedded therein to sense its surface conditions, serves to warn approaching motorists of a dangerous icy road surface condition.

The system as described thus far is somewhat similar to the system described in the earlier-filed co-pending application of Howard J. Goldman. In the use of such an earlier system, however, it is possible that the presence of electrically conductive deposits such as rain, water, slush or snow upon the surface of the sensing head 10 could give the same result as the presence of a non-conductive deposit such as ice or frost. Although a wet roadway condition, due to rain or slush, could be considered slippery, there are many instances wherein it would be preferable for the system to be able to differentiate between icy and wet conditions, and for the warning sign 28 to selectively indicate the "ICY" or "SLIPPERY" warnings.

This desirable result is achieved in the present invention through the use of a conductivity detector incorporated in the nuclear sensing head 10. The addition of a conductivity detector provides additional information with respect to the road surface condition such that, in combination with the nuclear radiation detector 14, complete and accurate roadway information is available to the motorist. As shown in FIGURE 1, an electrically conductive ring 46 is positioned into, and flush with, the surface of the nuclear sensing head 10. Preferably, the electrically conductive ring 46 is insulated from and at a different electrical potential than the metal surface of a radiation shield 62 upon which the thin layer deposits of ice or water are to be detected. This added electrically conductive ring 46 is connected into a circuit so as to respond primarily to the presence of conductive deposits only, such as rain, water, or slush and is not responsive to non-conductive deposits, such as ice or frost.

As also shown in FIGURE 1, the electrically conductive ring 46 and the thin layer surface 62 which receives the deposits are connected as one arm in a resistive bridge arrangement 30 by means of the conductors 34 and 32, respectively. The bridge is further comprised of the fixed resistor 38 and the variable resistors 40 and 42 connected in a well-known manner with the potential source 36 so as to provide an output to the amplifier 44 when the bridge is unbalanced by the presence of a conductive deposit on the sensing head 10. As explained in greater detail hereinbelow, the presence of rain, water, slush or other conductive deposits upon the sensing head 10 to unbalance the bridge 30 causes an output signal from the amplifier 44 to operate the logic circuit 24 and the power switch 26, so as to energize the indicating sign 28 and light up the word "SLIPPERY." Thus, in the present invention, when ice or frost is deposited on the roadway surface, and accordingly, on the surface of the sensing head 10, the system will indicate the presence of a non-conductive surface deposit, and the indicator "ICY" will be energized. The conductivity detector incorporated in the sensing head 10 serves to distinguish when such surface deposit is liquid and conductive, or dry and nonconductive, and if the former is the case, the indicator "SLIPPERY" in the warning sign 28 will be energized. If the roadway is both icy and wet, then advantageously, both warnings may be energized, if desired.

Turning now to the novel details of the sensing head 10, and more particularly to FIGURES 2, 3, and 4 of the drawing. As there shown, the improved nuclear sensing head 10 advantageously comprises a cup-shaped base member 50 which may be formed of die-cast metal or the like. The upstanding annular flange 52 of the base member 50 is provided with suitable threads around its outer peripheral surface for threadedly receiving the cylindrical walls 54 of a back scattering ring member 56. Advantageously, the cylindrical back scattering ring member 56 may be threadedly assembled on the base member 50 and sealed thereto, so as to prevent entry of moisture or dirt, by means of an annular O-ring 58 positioned between the base member 50 and the back scattering ring wall 54.

In accordance with a further feature of the inventive nuclear sensing head 10, a nuclear particle detector such as the Geiger-Mueller detector 14 is positioned within the back scattering ring member 56. For this purpose, a suitable support member 60 may be provided. Positioned above the Geiger-Mueller detector 14 is a radiation shield or disk 62 which is provided with inwardly tapered peripheral walls 64 for reasons to be described in greater detail hereinbelow. At the center of the nuclear shield 62 there is positioned the source of nuclear radiation 12. While the nuclear source 12 may take any desired form, advantageously, a washer, a disk, or molded button of epoxy embedded with radiation material may be utilized. It is to be noted that collimation of the nuclear radiation is not limited to the nuclear source 12, since it may be at either the source or at the end of the sensing head or at both positions, as desired.

As particularly shown in FIGURE 2 of the drawing, the inner peripheral walls of the back scattering ring 56 are formed with an inward taper 66 substantially parallel to and spaced from the inwardly tapered peripheral walls of the radiation shield 62 so as to define an annular input window 72 for the radiation particles from the nuclear source 12. The upper portion of the back scattering ring 56 is formed with an inwardly extending flange 68 which extends over the radiation shield 62 so as to define a collimating slit 70 for receiving the radiated nuclear particles from the source 12. The particles passing through the collimating slit 70 then pass through the annular input window 72 and into the G–M radiation detector 14 to cause ionization therein in a well-understood manner. It further is advantageous to provide sealing means at the collimating slit 70 so as to prevent moisture, dirt and other foreign elements from entering into the G–M detector. Advantageously, the seal may be formed of a suitable epoxy or other radiation transparent material.

As stated above, it is a feature of this invention that a ring of electrically conductive material be positioned on the radiation shield 62 so as to provide a conductivity detector suitable for detecting and indicating the presence of conductive elements such as rain, water, slush and the like on the thin layer surface being sensed. Preferably, the electrically conductive ring 46 may be formed of a stainless steel annular conductor positioned in an epoxy filled groove 74 provided on the radiation shield 62 between the radiation source 12 and the collimator slit 70. Since the conductive ring 46 is insulated from the radiation shield 62, by the epoxy, an open electrical circuit normally will exist between the conductive ring 46 and the shield 62. The conductive ring 46 may be electrically connected, by means of a conductor 76, which passes through the radiation shield 62 and is insulated therefrom as shown in FIGURES 2 and 3 of the drawing, to a terminal 78 provided in the support shelf 60 and a conductor 80 passes through the insulator 82 and the base member 50 to the conductivity circuit. Similarly, the electrical output of the G–M detector 14 is taken through a spring contact 84 and a conductor 86 which passes through the insulator 88 and the base member 50 to the radiation counter circuit. Referring specifically to FIGURE 4, wherein is shown a plan view of the sensing head 10, it will be seen that the conductive ring 46 is shown as spaced by the distance P2 from the nuclear particle or beta source 12. The distance from the nuclear particle or beta source 12 to the closest point on the epoxy filled groove 74 is shown as the distance P1, while the distance from the nuclear particle or beta source 12 to the furthest point on the epoxy filled groove 74 is shown as P3. If it is assumed that the width of the conductive ring 46 can be symbolized as $\Delta$, and the uniform conducting deposit of thickness $t$ and volume resistivity $r$, completely covers the ring conductor 46 and the epoxy insulation to permit the completion of an electrically conducting path between the conducting ring 46 at the potential $V_r$, and the surrounding metal surface of the radiation shield 62 at the potential $V_s$, will provide a current flow approximately equal to:

$$I = \left(\frac{2\pi t}{r}\right)(V_r - V_s)\left[\frac{1}{\ln\left(\frac{P2}{P1}\right)} + \frac{1}{\ln\left(\frac{P3}{P2+\Delta}\right)}\right]$$

In one illustrative embodiment of the present invention the sensing head was provided with the following approximate dimensions:

$P1 \approx 1$ cm.
$P2 \approx 1.075$ cm.
$P2 + \Delta \approx 1.150$ cm.
$P3 \approx 1.225$ cm.

Assuming the deposit upon the sensing head of a typical layer thickness of $t \approx 0.11$ cm., calculations based upon the current equation given above indicate the following. Where $(V_r - V_s) = 10$ volts.

(A) *Current for an ice or frost deposit*

(a) $I \approx 1 \times 10^{-6}$ amp at 0° C.; $r \approx 4 \times 10^7$ ohm-cm.
  (b) $I \approx 1 \times 10^{-8}$ amp at −19° C.; $r \approx 4 \times 10^9$ ohm-cm.

(B) *Current for a rainwater deposit*

(a) $I \approx 4.5 \times 10^{-3}$ amp at 17.6° C.; $r \approx 1 \times 10^4$ ohm-cm.

(C) *Since many road conditions may provide for salting the surface, the current for rainwater mixed with salt to the extent that the deposit contains 1.5% of salt in solution, is computed as*

(a) $I \approx 0.5$ amp at 0° C.; $r \approx 70$ ohm-cm.
  (b) $I \approx 1.0$ amp at 30° C.; $r \approx 35$ ohm-cm.

In view of the extremely small currents that result from thin ice or snow deposits, the nuclear particle or beta ray absorption and scattering technique is used to provide a more reliable detection of such deposits. The electrical conduction techniques will uniquely aid in establishing the presence of wet surfaces. Typical readings for the combined beta ray absorption and scattering techniques and the electrical conduction techniques are as follows:

|  | Approximate relative amplitude in measured units |
|---|---|
| (a) Dry surface with small amount of impurities, such as dust, on the combination detector: | |
|   (1) Beta ray detection | 70–85. |
|   (2) Electrical conduction detection | Negligible. |
| (b) Thin frost or ice deposit (about 0.004 inch thick): | |
|   (1) Beta ray detection | 50–60. |
|   (2) Electrical conduction detection | Negligible. |
| (c) Thick ice deposit (about .06 inch thick): | |
|   (1) Beta ray detection | 30–40. |
|   (2) Electrical conduction detection | Negligible. |
| (d) Rainwater deposit: | |
|   (1) Beta ray detection | 20–30. |
|   (2) Electrical conduction detection | 4.5. |
| (e) Rainwater plus salt: | |
|   (1) Beta ray detection | 20–30. |
|   (2) Electrical conduction detection | >500. |

Accordingly, it can be seen that the combined techniques provided by the combined sensing head and logic indicating network serve to distinguish between the various conditions existing on the surface dependent upon the conductivity or non-conductivity of the material deposited thereon. The operation of the electrical indicating circuit will now be described with particular respect to FIGURE 5 of the drawing. The circuit operation will be illustratively described with the assumption that a thin frost deposit has first occurred and then the thin frost deposit sublimates to leave a dry surface followed by rain later in the day. These assumptions will take into account all of the conditions of operation of the circuit so that it can be fully understood by those skilled in the art, who also will appreciable that the circuit of FIGURE 5 represents but one illustrative embodiment of the invention and that other circuits embodying the novel principles of the invention also may be used with advantage.

Figure 5:
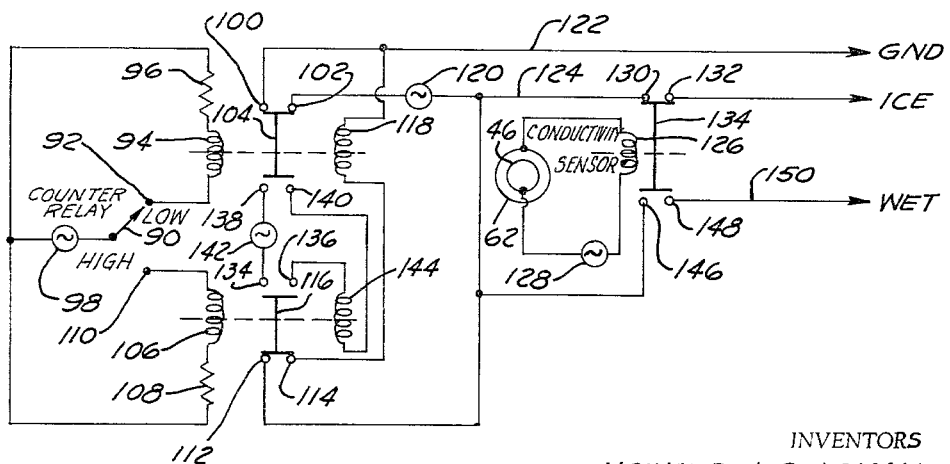
FIGURE 5 is an electrical schematic circuit diagram of one illustrative embodiment of condition indicating and logic circuit capable of indicating an icy or wet surface condition in response to the operation of the nuclear sensing head.

Turning particularly to FIGURE 5 of the drawing, it can be seen that the frost deposit will drive the counter relay down since the rate at which the beta particles are counted will decrease as the frost layer attenuates the number of beta particles per second reaching the Geiger-Mueller detector 14. When the counter relay pointer 90 drops to some preset value, the pointer contact will complete the circuit which includes the relay low contact 92, the primary relay coil 94, the resistance 96 and the potential source 98. Upon completion of the circuit, the relay coil 94 will be energized to cause the terminals 100 and 102 to be shorted by the relay armature 104. At the same time, the counter relay pointer 90 will be moved from the HIGH relay contact to open the circuit to the relay coil 106. This results in the terminals 112 and 114 being shorted by the relay armature 116.

The shorting of the terminals 112 and 114 complete an electrical circuit for the hold coil 118 which serves to maintain the relay armature 104 in its position shorting terminals 100 and 102 to apply the electrical potential of source 120 to the conductors 122 and 124. It will be noted that the terminals 100 and 102 will be maintained shorted by the hold coil 118 even if the relay pointer 90 moves and breaks pointer contact from the terminal 92, provided the pointer 90 does not contact the HIGH terminal 110.

The frost deposit on the sensing head will provide an extremely high impedance for electrical conduction, since frost is a non-conductor, so that the conductivity sensor does not complete a circuit to energize the conduction coil 126 from the voltage source 128. As such, the relay terminals 130 and 132 remain normally shorted by the relay armature 134 and the energizing potential from the voltage source 120 is applied over the conductors 122 and 124 to energize the "ICY" indication in the warning sign 28.

If it is assumed now that the frost deposit sublimates away, a dry surface will be left on the sensing head 10. Under such conditions, there will be no attenuation to the radiation of the beta particles across the sensing head and through the collimating slit 70, to thereby cause an increase in the rate of detection of such beta rays at the G–M detector 14. This increased detection rate of the beta particles will, upon smoothing integration cause the counter relay pointer 90 to swing in the other direction until it makes contact with the HIGH terminal 110, as shown in FIGURE 5 of the drawing. When the relay pointer 90 contacts terminal 110, relay coil 106 is energized in the circuit comprising resistor 108 and voltage source 98 to cause the relay armature 116 to move upwardly for shorting the terminals 134 and 136. At the same time the terminals 112 and 114 will be opened to de-energize the hold coil 118 for the relay armature 104. As a result, the aramature 104 drops to open the short circuit between terminals 100 and 102 to de-activate the circuit which previously applied indicating potential to the "ICY" indicator and the warning sign.

The deactivation of the hold coil 118 causes its armature 104 to short the terminals 138 and 140 thereby closing a hold circuit between the potential source 142 and the hold coil 144 for the relay armature 116. As explained above, the operation of the hold coil 144 maintains a relay armature 116 in position even though the relay pointer 90 may swing away from the terminal 110. As such, the relay armature 116 will be maintained in position until such time as the relay pointer 90 again drops low enough to contact the low terminal 92 under the effects of some obsorbing deposit as previously described. With the relay armature 116 held in position to short the terminals 134 and 136, no lights will be on in the warning sign since no potential is applied thereto.

If we now assume that some rainfall occurs at a later time, the rate of the beta particle detection will again decrease but at this time the electrical convectivity of the conductivity sensor increases. The decrease in the detection of beta particles causes the circuit to operate in exactly the same manner as described above for frost deposit except that in addition to the energzation of the hold relay coil 118 and the shorting of contacts 100 and 102 by relay armature 104, the conductivity sensor also is shorted to cause the relay coil 126 to be energized by the voltage source 128. Energization of the conductivity relay 126 causes its armature 134 to short the terminals 146 and 148 at the same time the terminals 130 and 132 in the "ICY" indication circuit will be opened.

Under the conditions described above, energizing potential will be applied from the potential source 120 to the conductor 150 which is connected to the "SLIPPERY" indicator within the warning sign 28, and the "ICY" indicator will be de-energized.

Upon evaporation of the rainwater upon the sensing head surface, leaving a dry surface, the relay pointer 90 will again contact the high terminal 110 to energize the relay coil 106 and to de-energize the relay coil 94. As explained above, this action will turn off all of the warning lights until such time as a icy or frosty condition reoccurs or a wet condition reoccurs to energize the appropriate indicator lights.

Those skilled in the art will appreciate that in those cases where it is desired to warn motorists only when frost or ice conditions occur and not when the road is merely wet and slippery, the above-described sensing head and detector indicating circuit may be utilized with the exception that the conductivity relay 126 is changed from a single pole, double throw relay, eliminating terminals 146 and 148, to a single pole, single throw relay which effectively opens and shorts the terminals 138 and 140 as the surface is respectively wet (conducting) or icy-dry (non-conducting). In addition, no "SLIPPERY" lights are used in the warning sign 28.

Those skilled in the art will further appreciate that the novel principles of the present invention may be applied to a frost-ice detector system having two sensing heads for warning the approaching motorist of a change in road conditions from one point in the road to another. For example, such a two head system may be utilized to sense the road condition at two separate points and to warn the motorist that he is going from one type of surface condition on the road to another type of surface condition on a bridge.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. The improvement of apparatus for selectively detecting and indicating conductive and non-conductive thin layer surface deposits comprising the combination of a sensing head having a radiation source of nuclear particles positioned upon a radiation shield, a nuclear radiation detector within said sensing head, the outer peripheral edge of said radiation shield defining an input window for the radiation particles from the radiation source to said radiation detector, a member of electrically conductive material positioned on said radiation shield and electrically insulated therefrom, an electrical indicating network having a first input connected to said radiation detector and a second input connected to said member of electrically conductive material, indicating means having a plurality of separately energizable indicators, and a logic circuit in said electrical indicating network for energizing one indicator in said indicating means when the surface deposit on said sensing head is electrically conductive so as to complete a circuit to said member of electrically conductive material and for energizing another indicator in said indicating means when the surface deposit on said sensing head is both electrically non-conductive and reduces the number of nuclear particles radiated from said source to said radiation detector.

2. The improvement of apparatus for selectively detecting and indicating conductive and non-conductive thin layer surface deposits comprising the combination of a sensing head having a radiation source of nuclear particles positioned upon a radiation shield, a nuclear particle back scattering ring positioned at the outer periphery of said sensing head and separated from said radiation source by a predetermined thin layer space, a nuclear radiation detector within said sensing head, the spacing between said back scattering ring and the outer peripheral edge of said radiation shield defining an input window for the radiation particles to said radiation detector, a normally open electrical conductivity circuit on said radiation shield, an electrical indicating network having a first input connected to said radiation detector and a second input connected to said electrical conductivity circuit, indicating means having a plurality of separately energizable indicators, and a logic circuit in said electrical indicating network for selectively energizing different indicators in said indicating means in response to the surface condition of said sensing head.

3. The improvement of apparatus for selectively detecting and indicating conductive and non-conductive thin layer surface deposits comprising the combination of a sensing head having a radiation source of nuclear particles positioned upon a radiation shield, a nuclear particle back scattering ring positioned at the outer periphery of said sensing head and separated from said radiation source by a predetermined thin layer space, a nuclear radiation detector within said sensing head, the spacing between said back scattering ring and the outer peripheral edge of said radiation shield defining an input window for the radiation particles of said radiation detector, a member of electrically conductive material positioned within said predetermined thin layer space and electrically insulated from said radiation shield, an electrical indicating network having a first input connected to said radiation detector and a second input connected to said member of electrically conductive material, indicating means having a plurality of separately energizable indicators, and a logic circuit in said electrical indicating network for energizing one indicator in said indicating means when the surface deposit on said sensing head is electrically conductive so as to complete a circuit to said member of electrically conductive material and for energizing another indicator in said indicating means when the surface deposit on said sensing head is both electrically non-conductive and reduces the number of nuclear particles radiated from said source to said radiation detector.

4. The improvement of apparatus for selectively detecting and indicating conductive and non-conductive thin layer surface deposits comprising the combination of a sensing head having a radiation source of nuclear particles positioned upon a radiation shield, a nuclear particle back scattering ring positioned at the outer periphery of said sensing head and separated from said radiation source by a predetermined thin layer space, said back scattering ring comprising an inwardly extending flange positioned over said radiation shield and spaced therefrom so as to define a collimator slit for the nuclear particles radiated adjacent said radiation shield within said thin layer space, a radiation transparent collimator seal enclosing a portion of said collimator slit for keeping moisture, dirt and other foreign elements outside of said sensing head, a nuclear radiation detector within said sensing head, the spacing between said back scattering ring and the outer peripheral edge of said radiation shield defining an input window for the radiation particles from the collimator slit to said radiation detector, a member of electrically conductive material positioned within said predetermined thin layer space and electrically insulated from said radiation shield, an electrical indicating network having a first input connected to said radiation detector and a second input connected to said member of electrically conductive material, indicating means having a plurality of separately energizable indicators, and a logic circuit in said electrical indicating network for energizing one indicator in said indicating means when the surface deposit on said sensing head is electrically conductive so as to complete a circuit to said member of electrically conductive material and for energizing another indicator in said indicating means when the surface deposit on said sensing head is both electrically non-conductive and reduces the number of nuclear particles radiated from said source to said radiation detector.

5. The improvement of apparatus for selectively detecting and indicating conductive and non-conductive thin layer surface deposits comprising the sub-combination of a sensing head having a radiation source of nuclear particles positioned upon a radiation shield, a nuclear particle back scattering ring positioned at the outer periphery of said sensing head and separated from said radiation source by a predetermined thin layer space, said back scattering ring comprising an inwardly extending flange positioned over said radiation shield and spaced therefrom so as to define a collimator slit for the nuclear particles radiated adjacent said radiation shield within said thin layer space, a radiation transparent collimator seal enclosing a portion of said collimator slit for keeping moisture, dirt and other foreign elements outside of said sensing head, a nuclear radiation detector within said sensing head, the spacing between said back scattering ring and outer peripheral edge of said radiation shield defining an input window for the radiation particles from the collimator slit to said radiation detector, and a member of electrically conductive material positioned upon said radiation shield and electrically insulated therefrom.

6. The improvement of apparatus for selectively detecting and indicating conductive and non-conductive thin layer surface deposits comprising the sub-combination of a sensing head having a radiation source of nuclear particles positioned upon a radiation shield, a nuclear particle back scattering ring positioned at the outer periphery of said sensing head and separated from said radiation source by a predetermined thin layer space, said back scattering ring comprising an inwardly extending flange positioned over said radiation shield and spaced therefrom so as to define a collimator slit for the nuclear particles radiated adjacent said radiation shield within said thin layer space, a nuclear radiation detector within said sensing head, the spacing between said back scattering ring and the outer peripheral edge of said radiation shield defining an input window for the radiation particles from the collimator slit to said radiation detector, and a member of electrically conductive material positioned upon said radiation shield and electrically insulated therefrom.

7. The improvement of apparatus for detecting thin layer surface deposits comprising the sub-combination of a sensing head having a radiation source of nuclear particles positioned upon a radiation shield, a nuclear particle back scattering ring positioned at the outer periphery of said sensing head and separated from said radiation source by a predetermined thin layer space, said back scattering ring comprising an inwardly extending flange positioned over said radiation shield and spaced therefrom so as to define a collimator slit for the nuclear particles radiated adjacent said radiation shield within said thin layer space, and nuclear radiation detector within said sensing head, the spacing between said back scattering ring and the outer peripheral edge of said radiation shield defining an input window for the radiation particles from the collimator slit to said radiation detector.

References Cited by the Examiner
UNITED STATES PATENTS

| 2,469,461 | 5/1949 | Russell | 250—83.6 |
| 2,999,936 | 9/1961 | Herzog et al. | 324—65 X |
| 3,019,338 | 1/1962 | Monaghan et al. | 250—83.4 X |

RALPH G. NILSON, *Primary Examiner.*

JAMES W. LAWRENCE, *Examiner.*